United States Patent [19]

Santandrea et al.

[11] Patent Number: 5,484,114
[45] Date of Patent: Jan. 16, 1996

[54] PROGRAMMABLY CONTROLLED ARMATURE WINDING METHODS

[75] Inventors: Luciano Santandrea; Massimo Lombardi; Salvatore Amato, all of Florence, Italy

[73] Assignee: Axis USA, Inc., Tampa, Fla.

[21] Appl. No.: 431,541

[22] Filed: May 1, 1995

Related U.S. Application Data

[63] Continuation of Ser. No. 139,641, Oct. 8, 1993, Pat. No. 5,413,289, which is a continuation of Ser. No. 738,199, Jul. 30, 1991, abandoned.

[51] Int. Cl.⁶ .................................................. H02K 15/04
[52] U.S. Cl. ................................. 242/7.03; 242/7.05 A
[58] Field of Search .......................... 242/7.05 R, 7.05 A, 242/7.05 B, 7.05 C, 7.03, 7.11

[56] References Cited

U.S. PATENT DOCUMENTS

| | | | |
|---|---|---|---|
| 2,339,589 | 1/1944 | Stearns . | |
| 2,394,529 | 2/1946 | Arpurth . | |
| 2,535,438 | 12/1950 | McCollom | 242/7.05 R |
| 2,568,945 | 9/1951 | Burdulis | 242/7.05 C |
| 2,610,804 | 9/1952 | Dreese | 242/7.05 A |
| 2,718,359 | 9/1955 | Hunsdorf | 242/7.05 R |
| 2,883,119 | 4/1959 | Braun . | |
| 3,163,921 | 1/1965 | Applegate . | |
| 3,169,301 | 2/1965 | Fletcher et al. | 242/7.05 C |
| 3,911,563 | 10/1975 | Anderson . | |
| 3,913,220 | 10/1975 | Miller . | |
| 3,924,816 | 12/1975 | Schubert et al. . | |
| 3,927,843 | 12/1975 | Dammar . | |
| 4,027,827 | 6/1977 | Biddison | 242/7.05 B |
| 4,520,965 | 6/1985 | Kimura et al. | 242/7.05 B |
| 4,541,170 | 9/1985 | Barrera | 242/7.05 B X |
| 4,671,465 | 6/1987 | Lemley et al. | 242/7.05 C X |
| 4,817,256 | 4/1989 | Riti et al. | 242/7.05 B X |
| 4,826,092 | 5/1989 | Tsugawa | 242/7.05 B |
| 4,834,305 | 5/1989 | Ruben et al. . | |

FOREIGN PATENT DOCUMENTS

| | | |
|---|---|---|
| 209624 | 1/1987 | European Pat. Off. . |
| 318063 | 5/1989 | European Pat. Off. . |
| 429766 | 6/1991 | European Pat. Off. . |
| 2054676 | 2/1981 | United Kingdom . |

*Primary Examiner*—Daniel P. Stodola
*Assistant Examiner*—Michael R. Manson
*Attorney, Agent, or Firm*—Fish & Neave; Robert R. Jackson

[57] ABSTRACT

Electric motor armatures are wound by moving a wire dispensing member relative to the armature so that the wire dispensing member itself guides the wire precisely into position on the armature and so that no additional wire guides or shrouds are needed to guide the wire and keep it out of contact with portions of the armature that it should not contact. The relative motion between the armature and the wire dispensing member is preferably under programmable control so that the apparatus can be readily reprogrammed when different types of armatures are to be wound. Specially shaped wire dispensing members may be employed.

4 Claims, 12 Drawing Sheets

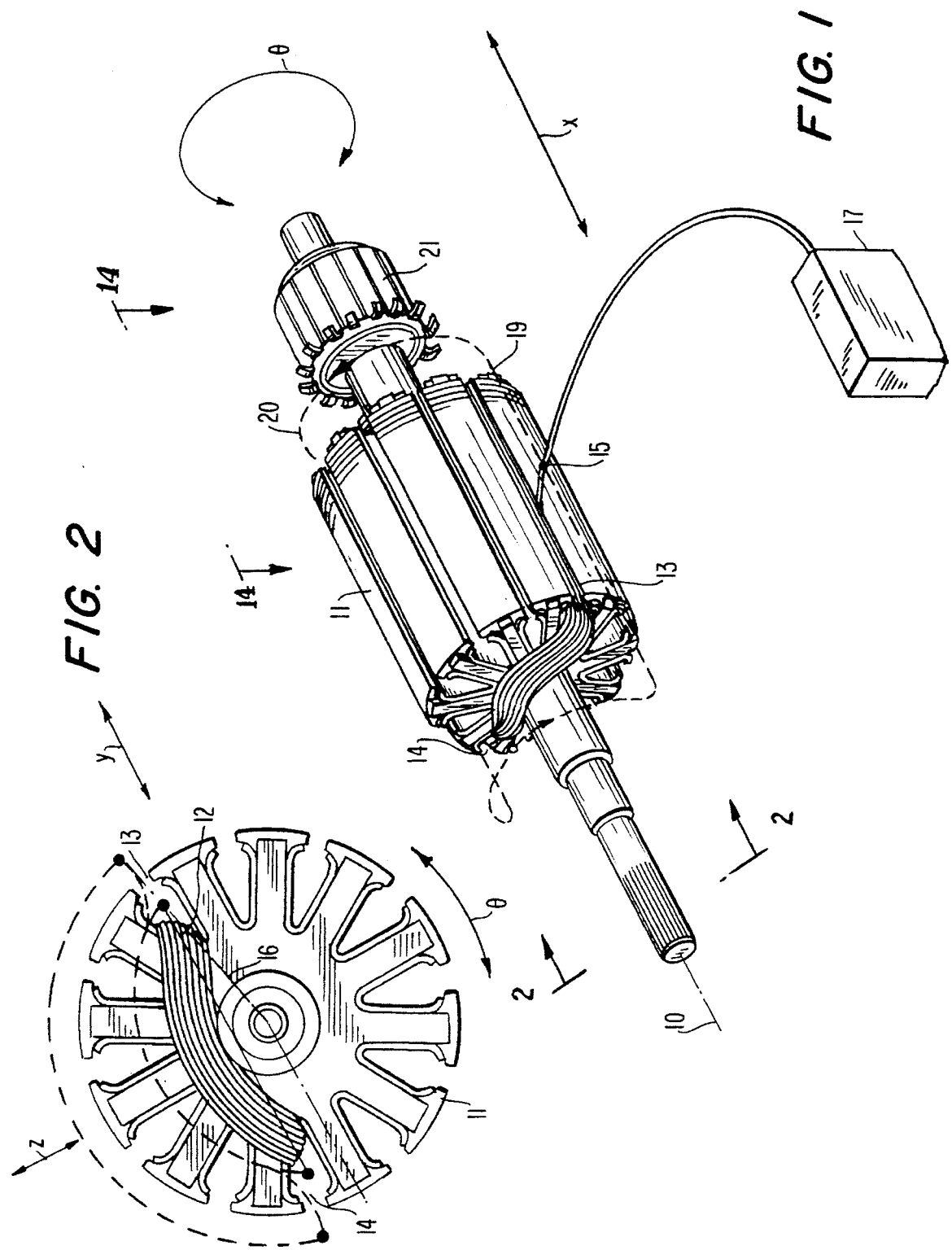

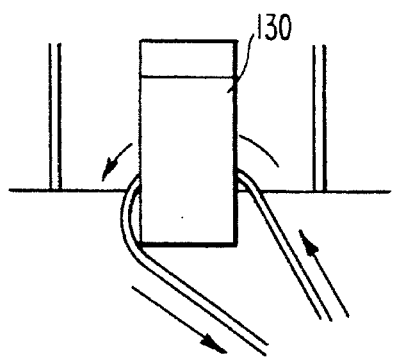
FIG. 18
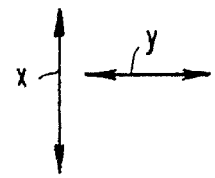
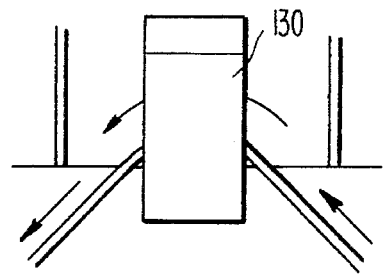
FIG. 17
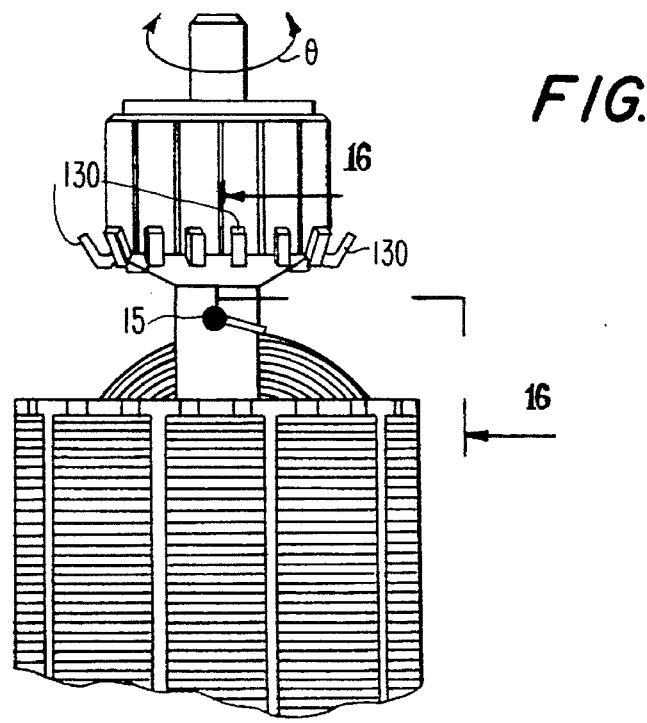
FIG. 14
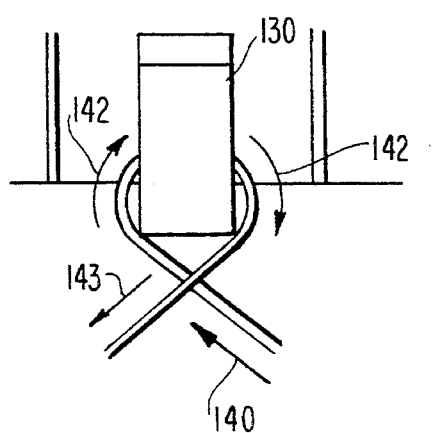
FIG. 15

PROGRAMMABLY CONTROLLED ARMATURE WINDING METHODS

This is a continuation of application Ser. No. 08/139,641, filed Oct. 8, 1993, now U.S. Pat. No. 5,413,289 which was a continuation of application Ser. No. 07/738,199, filed Jul. 30, 1991, now abandoned.

BACKGROUND OF THE INVENTION

This invention relates to methods and apparatus for winding armatures and for connecting the related armature coil leads to the commutator of the armature.

A primary object of the invention is to provide methods and apparatus for winding armatures without the need for wire winding guides used in prior art machines to guide the wire delivered by a flyer into the slots of the armature stack. By eliminating such wire guides, numerous advantages can be obtained. These advantages include eliminating costly machining processes required for producing the wire guides. Another advantage consists in avoiding the tensile fatigue which the wire undergoes using the winding guides. In conventional winding, this occurs because the wire being delivered by the flyer hits surfaces and/or edges of the winding guides each time the wire is drawn to run into the slots of the armature stack.

The invention also allows for the elimination of the traditional tooling required for carrying out lead connections to the commutator. Such tooling typically includes an outer commutator shield for avoiding the possibility that the wire being wound may catch on the commutator during winding of armatures having tang connections. Such tooling also typically includes an inner commutator shield for covering certain commutator tangs while exposing others for lead attachment. Tooling of this type and methods for obtaining tang connections have been described in U.S. Pat. Nos. 3,927,843 and 3,913,220. Another lead attachment tool which can be eliminated is the hooking plate which facilitates attachment of the wire to the tangs of the commutator (see, for example, commonly assigned U.S. patent application Ser. No. 610,928, filed Nov. 9, 1990). Elimination of these lead connection tools reduces machine manufacturing costs, and also provides for a winding machine which can attach leads belonging to different armature types without requiring the usual change-over or set-up of such tools, as is required in conventional winding machines.

The invention can also be used to ensure that the wire does not hit the commutator during winding. In conventional winding operations, the wire delivery point of the flyer has a trajectory which would cause the wire to catch on the commutator at periodic intervals. To avoid this, conventional machines are provided with the previously mentioned outer shield for covering the commutator. Even so, the wire hits the outer shield, which causes the wire being wound to be subjected to tensile fatigue. The present invention makes it possible to keep the wire entirely clear of the commutator during the winding operation, thereby avoiding this problem.

Different armature types have different parameters for purposes of winding. These different parameters include: the number of stack slots for receiving coils, the number of lead attachments to commutator, the stack length, the stack diameter, the commutator diameter, the commutator length, the distance separating the commutator face from its adjacent stack end face, the winding scheme, and the diameter of the armature shaft (i.e., the diameter of the shaft portions around which the coils are supported). In conventional winding, variations in the above parameters usually require the machine or its various parts to be extensively modified to adapt the flyer winder to wind different armatures. The methods and apparatus of this invention greatly reduce or simplify the adaptations required in order to wind armatures of different types in the same winder.

SUMMARY OF THE INVENTION

In accordance with this invention the wire is delivered to the armature by a wire dispensing member which follows a path of motion relative to the armature which very closely conforms to the desired coil configuration. Means are provided for independently producing relative motion of the armature and the wire dispensing member along several different axes. For example, these axes may include rotation of the armature about its longitudinal axis, relative longitudinal motion of the armature and wire dispensing member parallel to this longitudinal axis, and relative motion of the armature and wire dispensing member along one or more axes transverse to this longitudinal axis. Preferably each of these components of relative motion is produced independently of all the others, and some or all are controlled by a programmable device such as a microprocessor. In this way little or no hardware has to be changed in order to adapt the machine to wind armatures of different types. All that is necessary is to reprogram the programmable control device. Because the apparatus can be made to exactly follow the path required to deposit the wire into the desired coils, no winding shrouds or commutator shields are required.

In addition to being able to wind coils on a very wide variety of different armatures, the same apparatus can guide the wire into contact and engagement with whatever lead termination elements (e.g., tangs or slots) the commutator has, again without the need for auxiliary machine components for guiding the wire.

Winding may also be facilitated in accordance with this invention by the provision of specially configured wire dispensing members. For example, the wire dispensing member may have a radially outwardly projecting flange substantially surrounding the wire outlet. The wire dispensing member is then moved relative to the armature so that a segment of the flange passes through each armature slot as wire is deposited in the slot. This protects the wire from the edge of the slot and ensures that the wire is guided perfectly into the slot.

Further features of the invention, its nature and various advantages will be more apparent from the accompanying drawings and the following detailed description of the preferred embodiments.

BRIEF DESCRIPTION OF THE DRAWINGS

FIG. 1 is a perspective view of an illustrative armature being wound in accordance with this invention.

FIG. 2 is a view taken along the line 2—2 in FIG. 1.

FIG. 14 is a partial view taken along the line 14—14 in FIG. 1.

FIGS. 15, 17, and 18 are enlargements of a portion of FIG. 14 showing possible ways of attaching a wire to a tang on the commutator of an armature in accordance with this invention.

FIG. 20 is taken along the line 20—20 in FIG. 21.

DETAILED DESCRIPTION OF THE PREFERRED EMBODIMENTS

Figure 4:
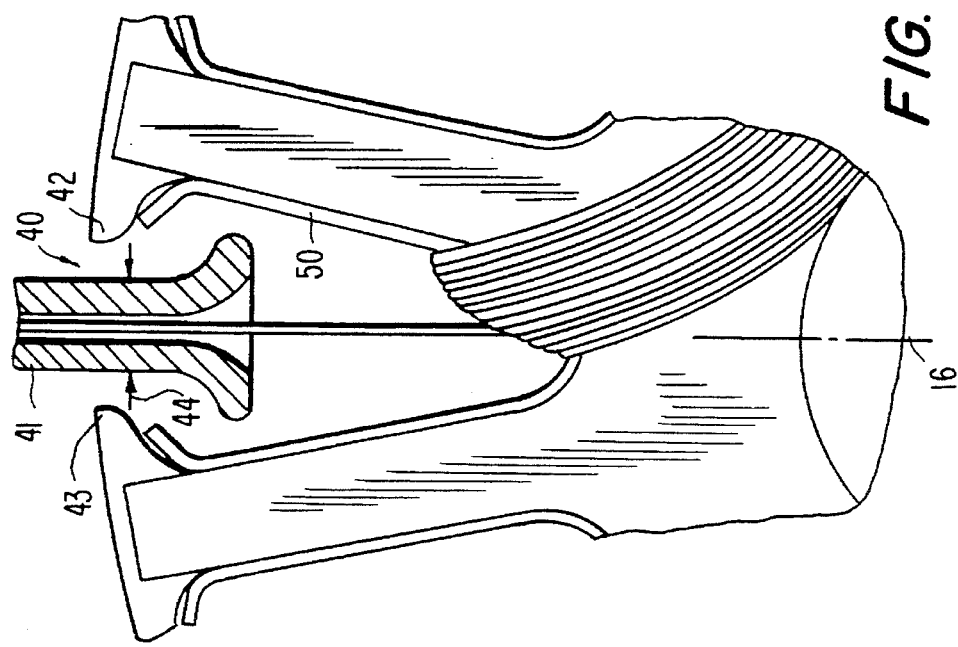
FIG. 4 is similar to a portion of FIG. 2 showing another possible wire dispensing member in accordance with this invention.

The axis convention shown in FIGS. 1 and 2 is used for convenience throughout the following discussion. In particular, X is an axis parallel to the longitudinal axis 10 of armature 11; Y is an axis parallel to a line 12 drawn through the center points of the two stack slots required for receiving a coil being wound; Z is an axis which is perpendicular to axis Y and also perpendicular to axis X; and theta is an angular axis about axis 10. In the following discussion, the above-mentioned axes are not necessarily absolute references, but may be considered as integral with the armature (i.e., a point may be described as moving along an axis, although the point may be stationary as seen from an absolute reference and only moving as seen from the armature).

In order to deposit the coil wire into armature slots 13 and 14 without using wire guides, a wire delivery point 15 is positioned in a predetermined position near or on the radial axis 16 of the first slot 13 which has to receive the coil being wound. For reasons which are more fully described in the following, point 15 can be inside or outside the slot. In order to deliver the wire into such a slot, the wire delivery point receiving wire from tensioning device 17 moves in relation to the armature along axis X. Once the wire has passed a first end face 19 of the armature stack by a predetermined distance (along X) in order to draw the wire through the end of the first slot and beyond the stack face, the wire delivery point starts to move along a predetermined curve 20, obtained by a combination of motions of the point along axes X, Y, Z, and theta so as to form the external portions of the coil. Such a curve defines a trajectory accomplished by the wire delivery point in order to deposit the first turns of wire and to draw them across the end face of the stack, while at a later stage of the core formation, as the coil builds up, the wire delivery point's movements on such a trajectory cause the wire to be laid on previously deposited turns of the coil, or on the armature shaft. During motion on such a trajectory, the wire delivery point must clear the outer surface of the armature shaft, and as the coil builds up, the wire delivery point must also clear coil turns which have already been delivered. When the wire delivery point moves on the side of the core which faces the commutator 21, the wire delivery point must also accomplish limited excursion along axis X in order to avoid contact with the commutator. Other requirements which must be met when determining such a wire delivery trajectory are more fully described in the following.

The wire delivery point continues to move along such a curve until it becomes aligned with the entrance of a second wire receiving slot 14 required to receive a further portion of the coil. Such an alignment is obtained when the wire delivery point is positioned at a predetermined distance beyond the stack face (along X). Once the wire delivery point has been aligned with the second receiving slot of the stack, the wire delivery point is moved with rectilinear motion parallel to axis X in order to draw the wire through the entrance of the slot and then along the slot itself. The wire delivery point continues to move on such a path until it reaches a predetermined distance beyond the opposite stack face, where it starts to move on a further predetermined trajectory obtained by a combination of motions on axes X, Y, Z, and theta in order to form the external portion of the coil on the second end of the armature. Such a trajectory can be the same as the one that has been previously described except that the wire delivery wire point will move in opposite directions along axes Y, X, and theta in order to again become aligned with the first wire receiving slot of the stack. Once this alignment has been reached, the point moves parallel to axis X toward and past the first slot in order to deliver the wire through its entrance and then along the slot itself to complete a turn of the coil.

To obtain the foregoing movement of the wire delivery point in relation to the armature, a first possible approach is to position the wire delivery point, as has been described, and translate the wire delivery point along axis X in order to deliver the wire into the slots and to draw the wire past the ends of the slots. Once the wire is at a predetermined distance beyond the stack face, the predetermined trajectory obtained by a combination of motions along axes X, Y, Z, and theta can be obtained by moving the wire delivery point along each of the axes X, Y, and Z, and by rotating the armature along axis theta.

A second possible technique for obtaining the previously described movement of the wire delivery point in relation to the armature is to position the wire delivery point in relation to the slot, as has been described, and to translate the armature along axis X to deposit the wire into the slots and to bring the wire delivery point up to a predetermined distance beyond the stack faces. Once this situation has been reached, the armature can rotate along axis theta, while the wire delivery point can move along axes Z and Y in order to obtain the predetermined trajectory.

Other techniques for obtaining the described movements of the wire delivery point in relation to the armature result from considering all the possible combinations which exist by having the four possible axis directions and the two members (i.e., the armature and the wire dispensing member) that can be moved in relation to each other.

Figure 3:
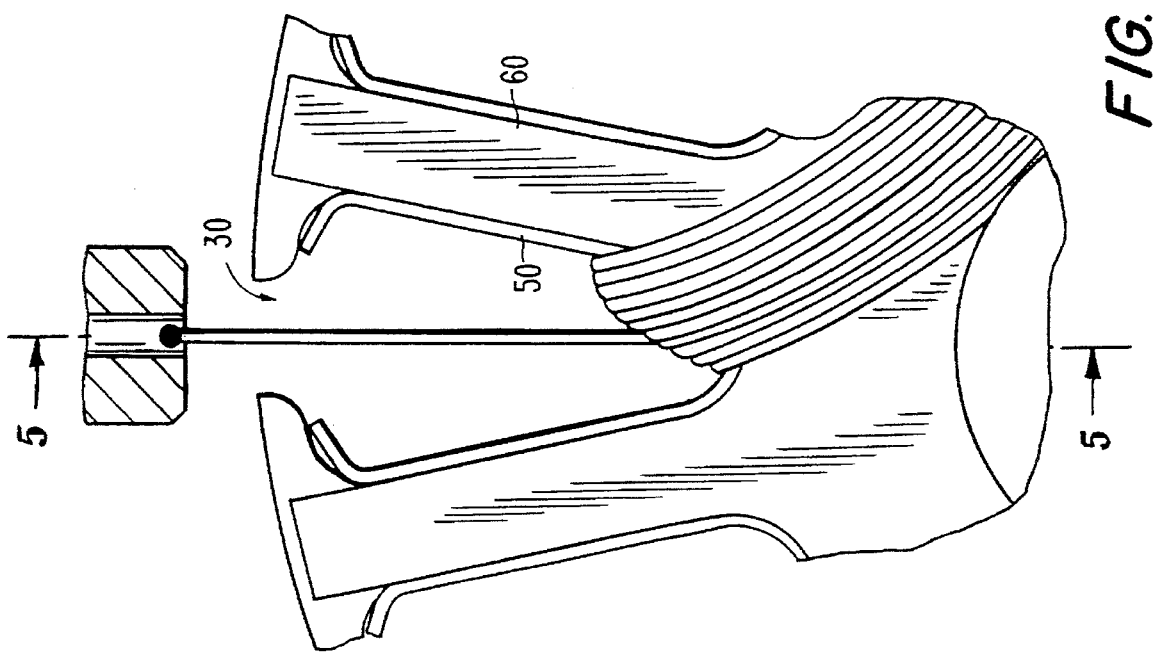
FIG. 3 is similar to a portion of FIG. 2 showing one possible wire dispensing member in accordance with this invention.

As shown in FIGS. 3 and 4, armatures can be divided into two categories in order to distinguish them on the basis of the size of their slot openings 30 and 40. The first category (FIG. 4) consists of armatures having such openings 40 with dimensions that are substantially larger than the size of the wire to be wound into their slots, while the second category (FIG. 3) consists of armatures having slot openings 30 which are only slightly larger than the wire size which must be wound into their slots.

To wind armatures of the first category using the previously described movements of the wire delivery point, a needle 41 having the wire delivery point at its extreme end can be positioned practically along the radial axis 16 of the slot. The wire delivery point of such a needle can travel inside the slot as shown in FIG. 4 during the rectilinear motion that has been described along axis X. Such a movement can be accomplished without bringing the needle into contact with the dove tail sides 42 and 43 of the slot. This is possible because the transverse dimensions 44 of the wire delivery portion of the needle, required to guarantee the stability of this member under wire tension and despite dynamic forces developed by the needle's motion at high speed, are much smaller than those of opening 40.

For armatures having small slot openings 30 compared to the wire than has to be wound, the transverse dimensions of the needles cannot pass safely through opening 30 (see FIG. 3). Therefore the wire delivery point must be positioned outside the slot, and as near as possible to opening 30 as the mechanical stability of the needle allows.

Figure 6:
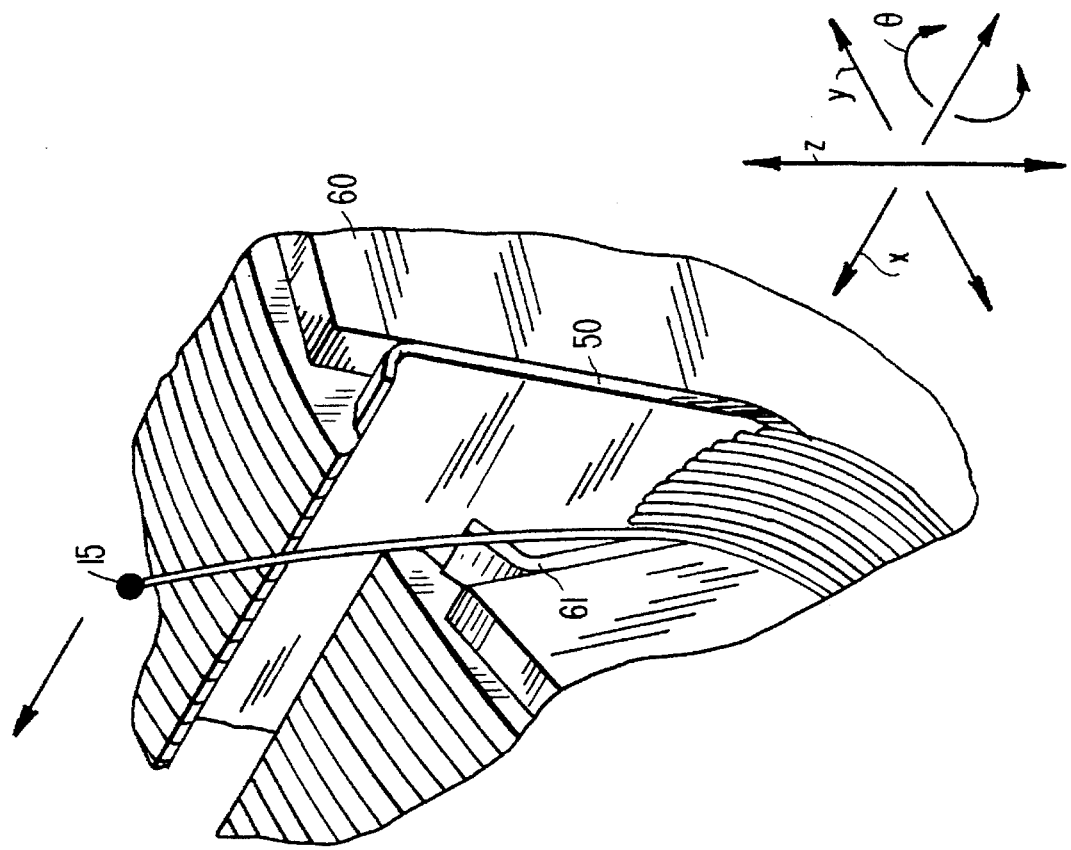
FIG. 6 is a partial perspective view of what is shown in FIGS. 3 and 5.
Figure 5:
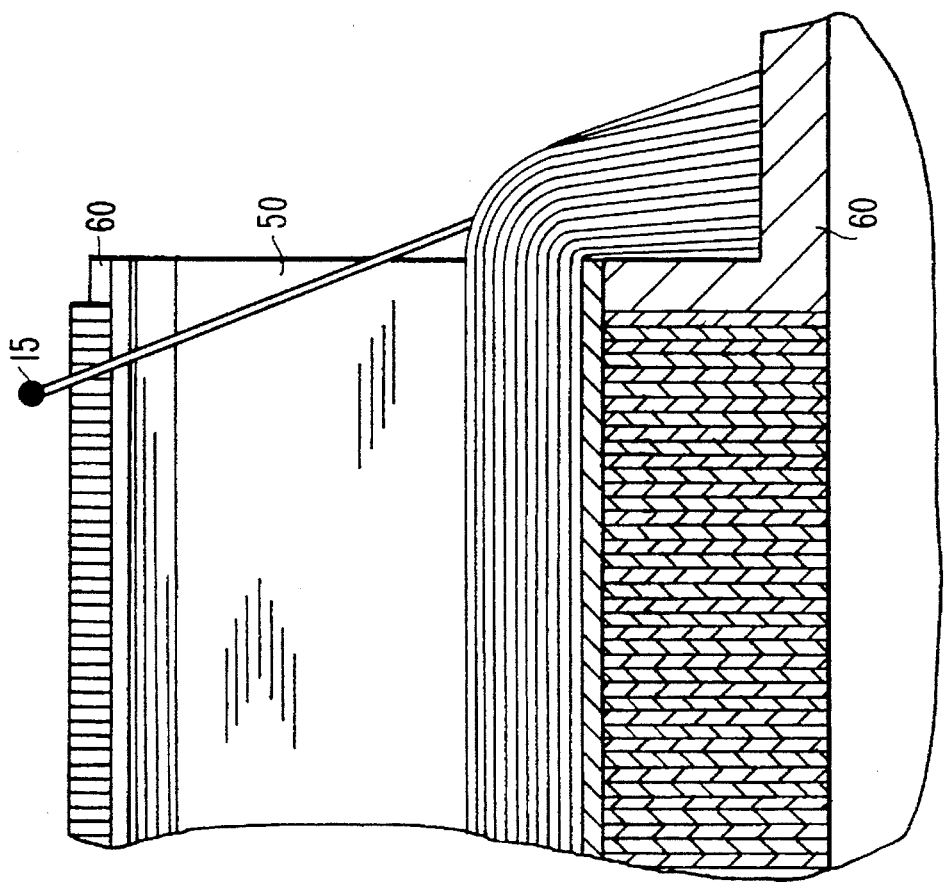
FIG. 5 is a partial sectional view taken along the line 5—5 in FIG. 3.

Modern armatures are provided with various means for insulating the coil receiving slots and the end faces of the stack. Such means include: the use of paper inserts 50 which are inserted in the slots and have the shape shown in FIGS. 3 and 4. In particular, inserts 50 line the interior of the slots and the opposing dove tail portions which lead to the slot openings. When inserts of this kind are used, the end faces of the armature are insulated by means of separate members called end molds or end fibers 60 which have the configuration shown in FIGS. 2, 5, and 6. The ends of paper inserts 50 are aligned with the outer face of molds 60 to avoid damaging the paper as the wire is drawn across the faces of the stack when forming the external portions of the coil.

During winding, when the wire is drawn through the entrances of coil receiving slots lined with paper inserts, the wire must not come into contact with or catch onto corners 61 (FIG. 6) of such inserts. If contact occurs, the inserts could bend, or even worse, they could tear in such corners. During winding, as the coil builds up against the face of the stack, the wire tends to be drawn all the more toward such a corner. In conventional winding using wire guides, such a situation is avoided by confronting and covering the ends of the inserts with parts of the wire guides in order to avoid the wire coming into contact with such portions. Solving this in conventional winding is among those problems which require tailor making the wire guides to suit the particular insert configuration which is being processed.

In winding in accordance with this invention using a wire delivery point positioned outside the slot as shown in FIG. 3, particular attention must be paid in order to avoid the wire coming into contact with corner 61. In such a situation, the trajectory which the wire delivery point should follow when the needle is moving in front of the stack must cause the wire to be drawn so that it clears the corner of the insert as the needle moves along axis X to deliver the wire through the slot entrance.

Figure 7:
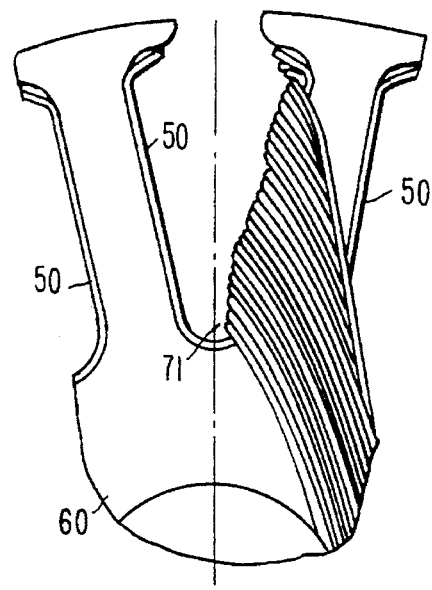
FIG. 7 is a view similar to FIGS. 3 and 4.

In order to obtain consistent filling of the armature slots, it is usually important, at least during the initial portion of the coil formation, to avoid the coil turns climbing along the slot walls, whereby the center bottom portion 71 of the slot is left empty as shown in FIG. 7. In conventional winding, such a situation is avoided by providing the wire guide with end portions which control the formation of the coil portion as it is being wrapped against the armature stack faces. Control of this kind also leads to correct coil formation inside the slots because the wire seats itself in its final position inside the slots only after the needle has laid a succeeding stretch of wire on to coil turns which are already wrapped against the stack face. Conventional wire guides have portions which are appropriately tailored to oblige the wire to deposit in a predetermined manner and therefore to suit the particular armature configuration which is being wound.

In accordance with the present invention a situation like that described above can be avoided by causing the wire delivery point to move toward the center of the armature (along axis Z) as the wire is being drawn beyond the end of the slot. This causes the wire to deposit on the bottom portion of the slot while the external turns of the winding tend to wrap near to the armature shaft. Such movement of the wire delivery point is usually carried out for a limited number of turns associated with the first stages of coil formation.

Figure 9:
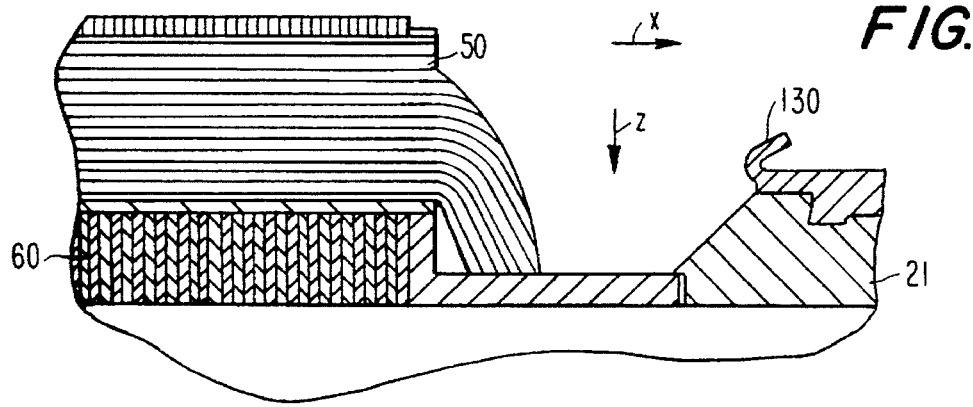
FIGS. 8 and 9 are views similar to FIG. 5.
Figure 8:
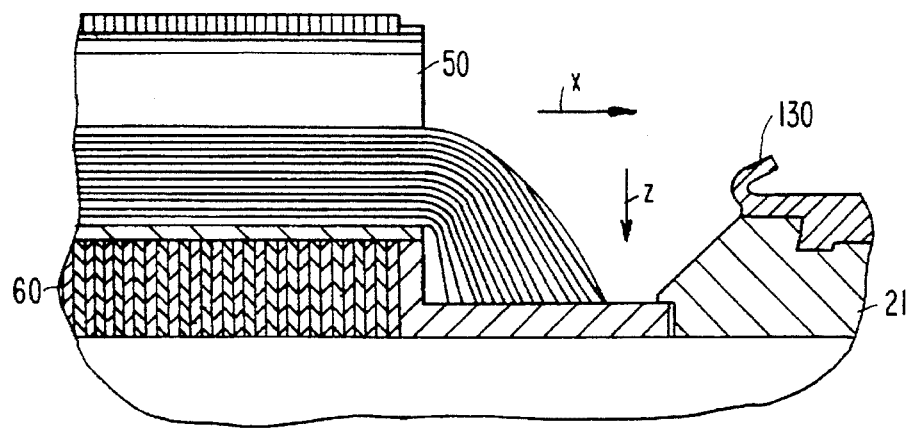

Armatures may also require different types of external coil formation as shown in FIGS. 8 and 9. The coil formation shown in FIG. 8 is "low" inside the stack slots. Therefore, it is also "low" against the stack faces, but it has a substantial extension away from the stack face. For coil formation of this type, the trajectory accomplished by the wire delivery point needs to draw the wire away from the stack faces and toward the armature shaft during the coil formation. This can be accomplished in accordance with this invention by moving the wire delivery point toward the armature shaft (axis Z) when drawing the wire beyond a slot end, and also by providing longer excursions along axis X.

In contrast to the "low" coil formation shown in FIG. 8, the coil formation shown in FIG. 9 is "high" inside the stack slots. Therefore, it is also "high" against the stack faces, but it has a short extension in front of the stack faces. In this case, the wire delivery point needs to follow a trajectory which guarantees a high slot fill, in the way that has been previously described. This type of coil formation also requires precautions, as previously stated, for keeping the wire clear of insert corners 61.

The trajectory which satisfies the foregoing winding requirements can generally best be chosen after carrying out trials on each armatures type which must be processed. Parameters which influence the choice of the correct trajectory include the required slot fill, the external configuration of the coil, the size of the armature, the number of coil receiving slots, the size of the wire to be wound, and the size of the wire receiving slot. Trial information can also take into account that the wire delivery point should accomplish different trajectories as the coil builds up against the stack ends, and also that different trajectories are required when different coils on the same armature are to be wound. Some armatures may not require movement along all of the axes which have been defined. For example, it may be sufficient to move the wire delivery point only along axis X and, when the wire delivery point is beyond the armature stack, also along axis theta, or just along axis theta.

Figure 10:
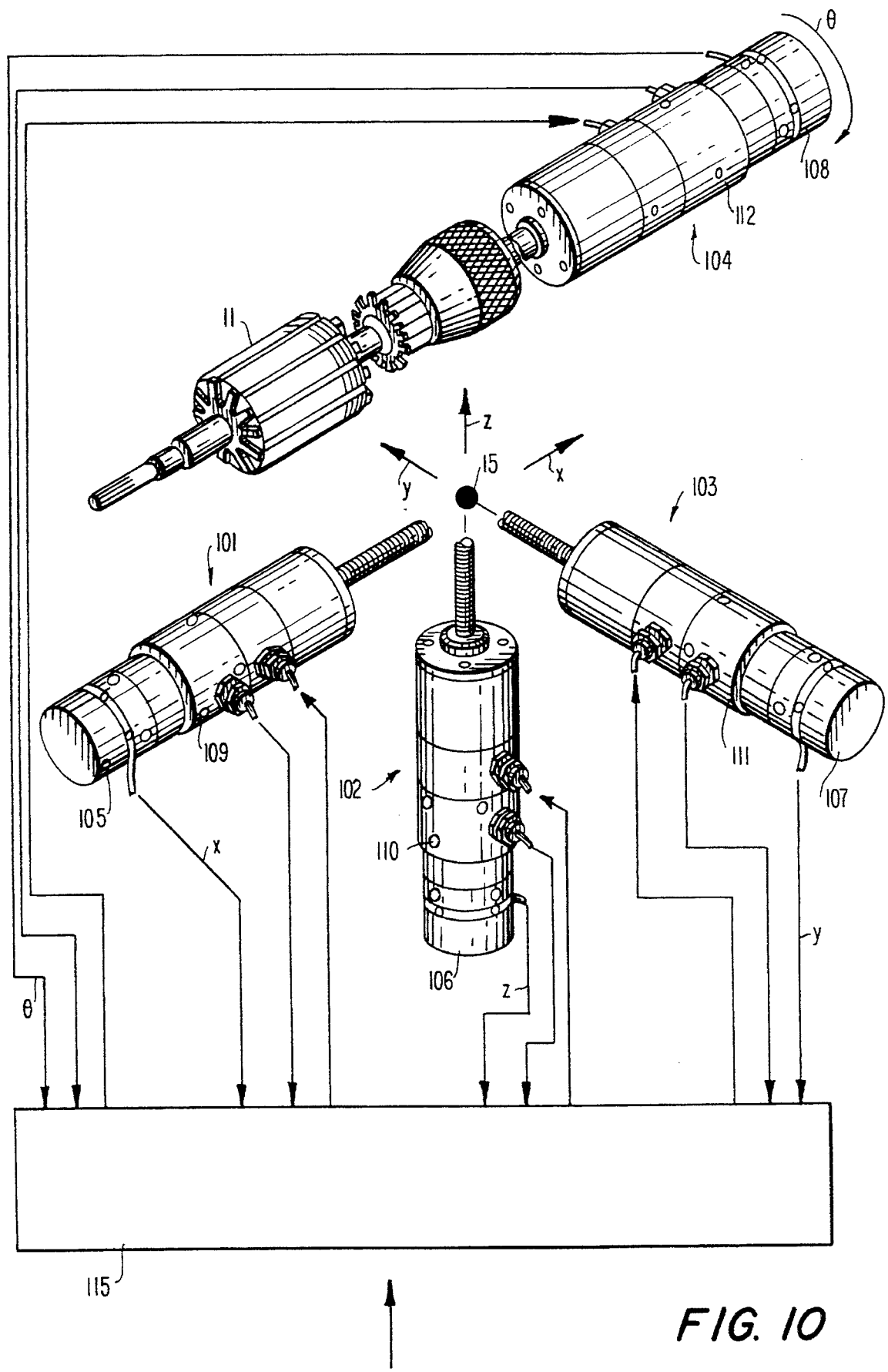
FIG. 10 is a perspective view showing certain elements of an illustrative embodiment of the invention. The master control element and connections to that element are shown in schematic block diagram form in FIG. 10.

Illustrative apparatus constructed in accordance with the principles of this invention for providing the above-described movements of the wire delivery point in relation to the armature, and which also allows for winding of different armature types, is shown in FIG. 10. In this apparatus each movement of the wire delivery point along axes X, Y, Z, and theta is obtained by means of independent actuators 101, 102, 103, and 104 which respectively command the needle or the armature to move along each of these axes in order to obtain the required predetermined trajectory. These actuators are preferably capable of variable speed and also variable torque performance (or force in the case of a linear actuator). The position (X, Y, Z, and theta) of the wire delivery point along each axis is preferably monitored by means of position sensors 105, 106, 107, and 108. Sensors 109, 110, 111, and 112 monitor the speed S X, S Y, S Z, S theta of the wire delivery point along each axis. Readings from sensors 105–112 are supplied to control unit 115 which contains the controls for actuators 101–104, and also a microprocessor.

On the basis of the outputs from sensors 105–112, and by using information which includes previously stored data relating to the trajectory which the wire delivery point must accomplish for a particular type of armature, the microprocessor portion of control unit 115 supplies signals to the controls of the actuators in order to ensure that the resulting movement of the wire delivery point is along a predetermined trajectory. This is achieved by moving the wire delivery point along coordinate axes X, Y, Z, and theta in appropriate timing. The wire delivery point assumes predetermined positions along such a desired trajectory in accordance with predetermined timing. The actuator controls in control unit 115 drive the actuators in a predetermined manner by acting on the speed and torque or force performance of the latter.

Figure 11:
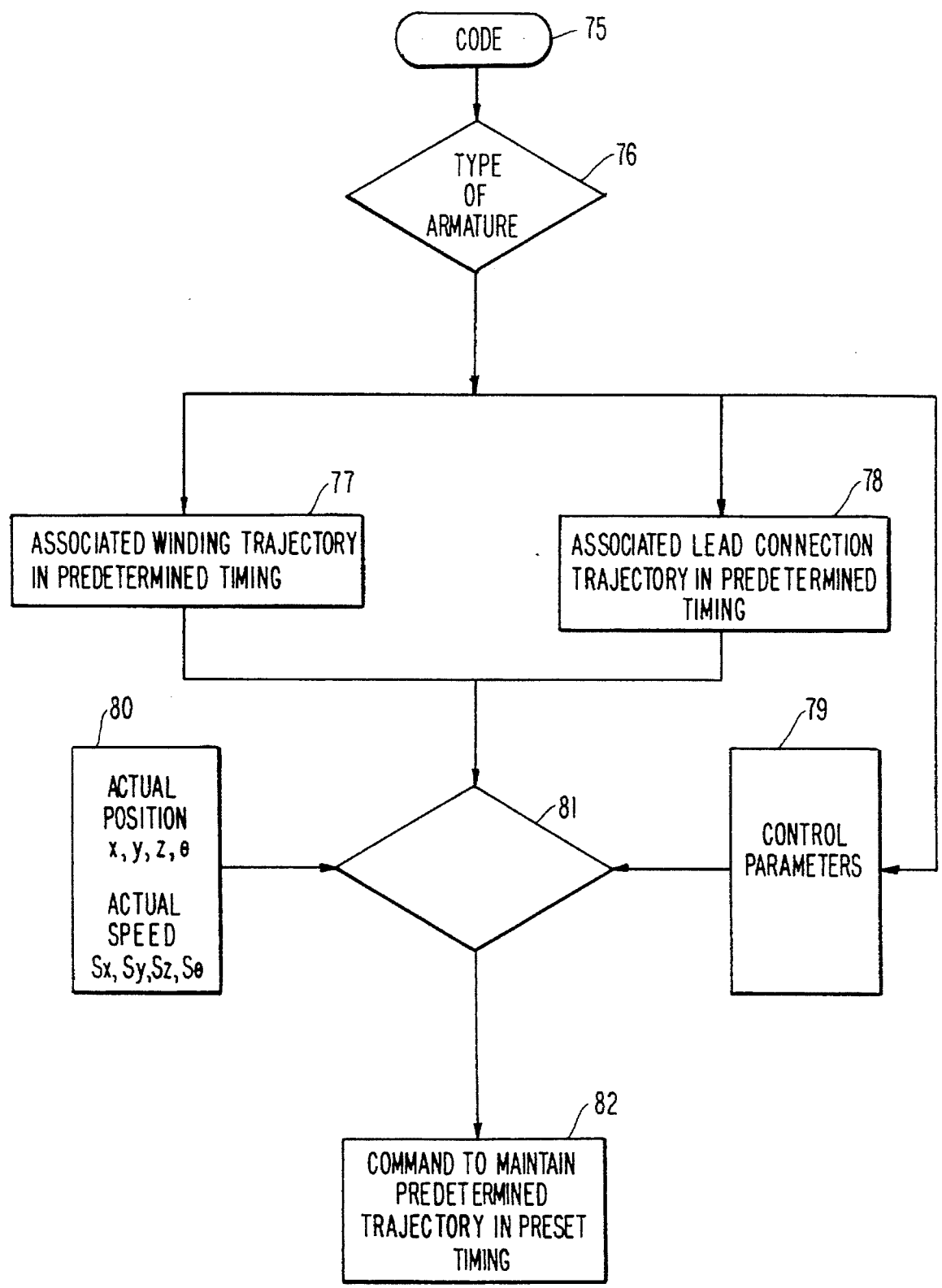
FIG. 11 is a flow chart of illustrative control functions in an illustrative embodiment of the invention.

As shown in FIG. 11, which is a flow chart of the operation of the microprocessor portion of control unit 115, external information to control the apparatus requires distinguishing the armature type which is to be processed. Once control unit 115 has acquired such instructions, usually in the form of a code entry 75 corresponding to the type of armature 76 to be processed, information stored in the control unit's memory (i.e., information relative to predetermined trajectory components 77 and 78 which suit the type of armature to be wound, and information relative to the control parameters 79 of the actuators in the system) is retrieved and used to control the winding process. In particular, the trajectory data 77 and 78 and control parameter data 79 are combined with feedback data 80 from sensors 105–112 as indicated at 81 in FIG. 11 to provide commands 82 for further control of actuators 101–104.

The microprocessor or computer of control unit 115 preferably contains predetermined trajectory information which defines the positions which the wire delivery point must reach in predetermined timing. Such trajectory information can be stored as a series of successive positions which the wire delivery point should reach along the axes in predetermined times. Trajectory information may also be stored by defining a predetermined trajectory function which the wire delivery point must follow in preset timing. In this latter case, by using the predetermined function, calculations can be done by the computer to define the new position which the wire delivery point should reach in a set time. A possible way of determining the trajectory information to be stored in control unit 115 is to position the wire delivery point in various positions along the required trajectory. This can be done during se up of the winder. When the needle is positioned in such positions, control unit 115 uses position sensors 105–108 to measure the exact coordinates of each position. Control unit 115 stores these coordinates in order to use them during actual winding. Trajectory functions can then be defined in order to determine further positions which are required between the ones that have been measured as just described.

The computer receives actual position information from sensors 105–108 and calculates the differences which exist between the actual position of the wire delivery point and the predetermined positions which must be reached in preset timing. By means of such differences and by means of control information which has been previously stored, the computer produces and sends a position reference signal to the controls of the actuators contained in unit 115. This allows the latter to command the actuators so that the wire delivery point is moved at rates of motion which guarantee that the required positions are reached at preset times.

A procedure of the above type which compares the actual and predetermined positions of the wire delivery point should be performed at predetermined time intervals. The length of these time intervals is dictated by the number of turns which the wire delivery point must wind in unit time and by the precision with which the wire delivery point should assume the predetermined positions.

The controls of the actuators may contain predetermined information relating to the rates of motion which the actuators must develop to obtain the required positions of the wire delivery point in predetermined timing. Such controls compare the actual speed information of the wire delivery point with the predetermined speed which the actuators must develop. By means of such a comparison, the rates of motion of the actuators can be varied to ensure that the wire delivery point reaches the required positions in preset times. This comparison must also be carried out at preset time intervals which depend on the same factors that have been described previously for the comparison relating to the position control of the computer.

Figure 12:
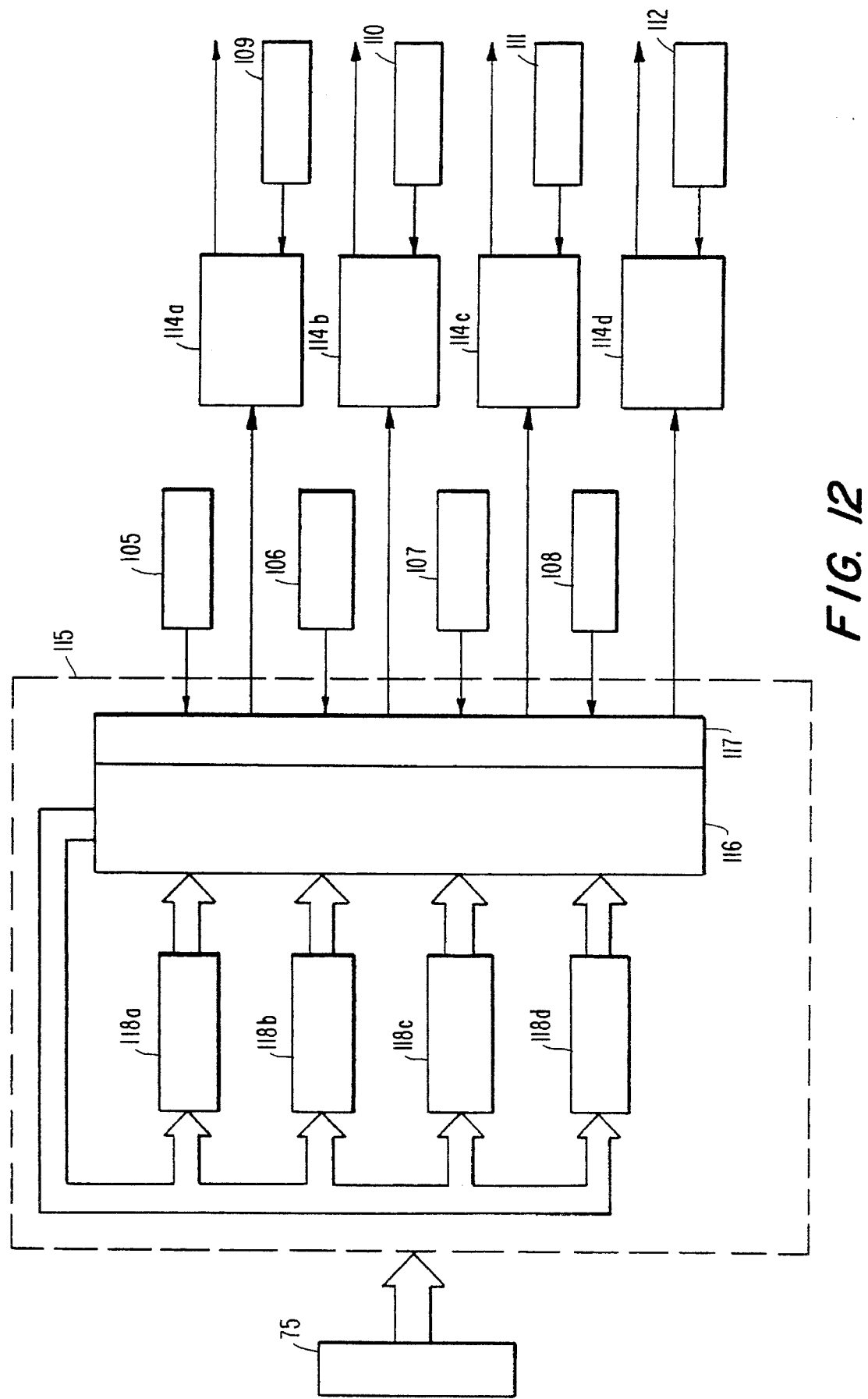
FIG. 12 is a more detailed block diagram of a portion of FIG. 10.

FIG. 12 shows more details of an illustrative embodiment of controls constructed in accordance with this invention. As shown in FIG. 12 control unit 115 includes central processing unit 116 which receives actual position information for the wire delivery point from position sensors 105–108 via interface unit 117. Central processing unit 116 compares this actual position information with previously stored information contained in memory areas 118a–d (e.g., look up tables or a write control system). This previously stored information may consist of a series of successive positions which the wire delivery point should reach in predetermined timing. This information may be written into memory areas 118 each time an armature must be wound (e.g., as a result of a calculation carried out by central processing unit 116 using previously stored functions), or it may be permanently stored in memory areas 118. Data entry device 75 (e.g., a conventional keyboard) may be used for entering a code indicative of the type of armature to be wound.

As mentioned above, central processing unit 116 compares actual position information with desired position information from memory areas 118. These comparisons are performed at predetermined time intervals (e.g., every 20 milliseconds) and result in the generation of four signals, respectively applied to actuator motor drivers 114a–d via interface unit 117 for continued control of actuators 101–104. Each cycle of operation may be of the following form for each actuator:

READ FROM LUT ALPHA (i+1),

READ ACTUAL SIGNAL ALPHA(i),

CALCULATE K (ALPHA (i+1) ALPHA (i)), and

OUTPUT SIGNAL TO ACTUATOR DRIVES CORRESPONDING TO CALCULATION OF THE PREVIOUS STEP, where LUT refers to the appropriate one of look up tables 118, ALPHA(i) is a position value (X, Y, Z, or theta) at time i, and K is a control parameter. Actuator motor drivers 114 use the signals from interface unit 117 to control the electric supply to the motors of actuators 101–104 so that the speed of the wire delivery point along the various axes can be changed in order to reach a required position in predetermined timing. Motor drivers 114 compare required speed performance of the wire delivery point with actual speed information coming from speed sensors 109–112 so that unwanted deviations can be corrected. The basic steps involved in the foregoing are: (1) moving the wire delivery point relative to the armature, (2) monitoring the position of the wire delivery point relative to the armature, and (3) controlling the rate of motion of the wire delivery point relative to the armature in accordance with the monitored position of the wire delivery point so that the wire delivery point moves along a predetermined path in required timing.

Figure 13:
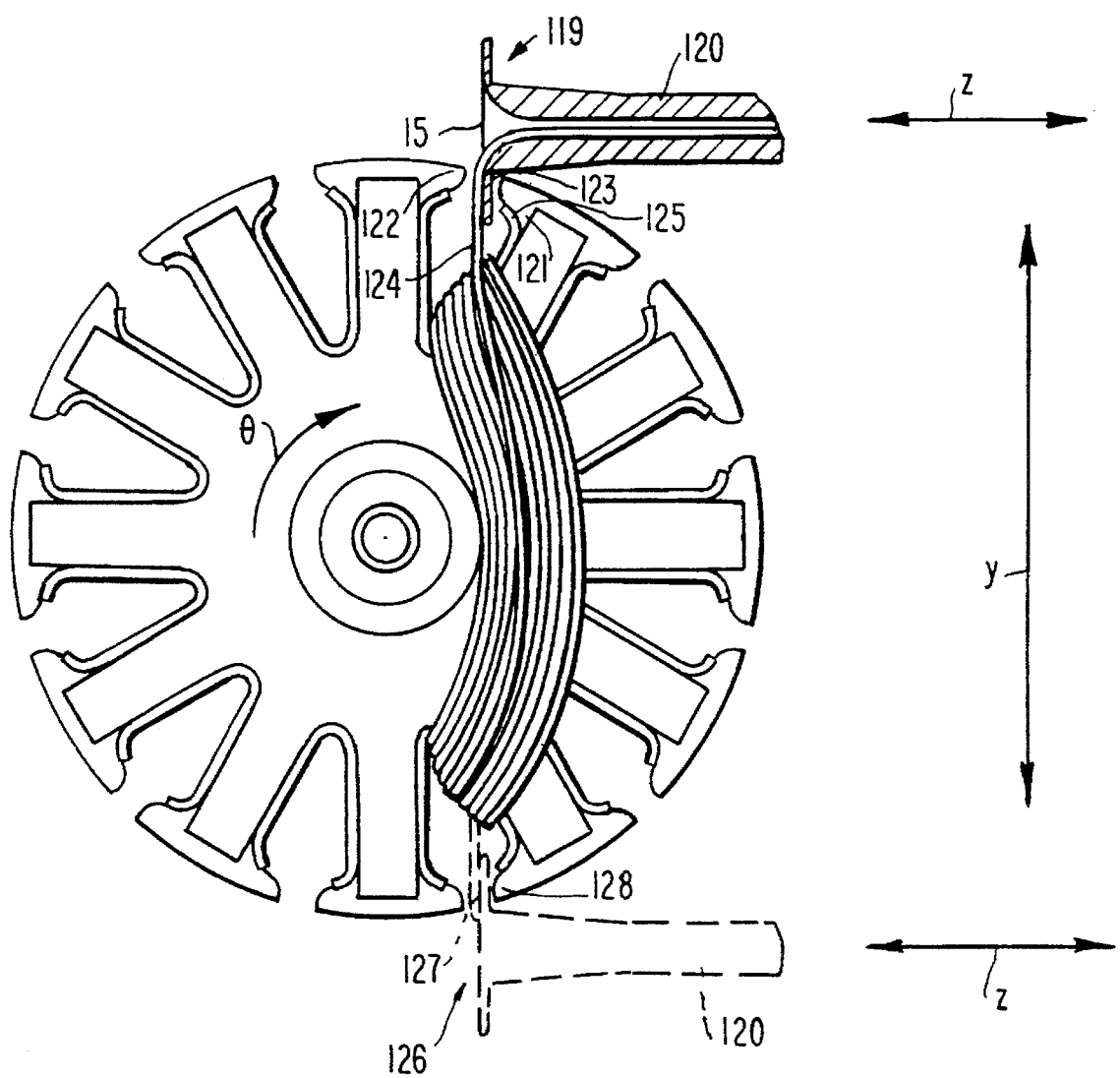
FIG. 13 is generally similar to FIG. 2 but with additional elements in accordance with another illustrative embodiment of the invention.
Figure 16:
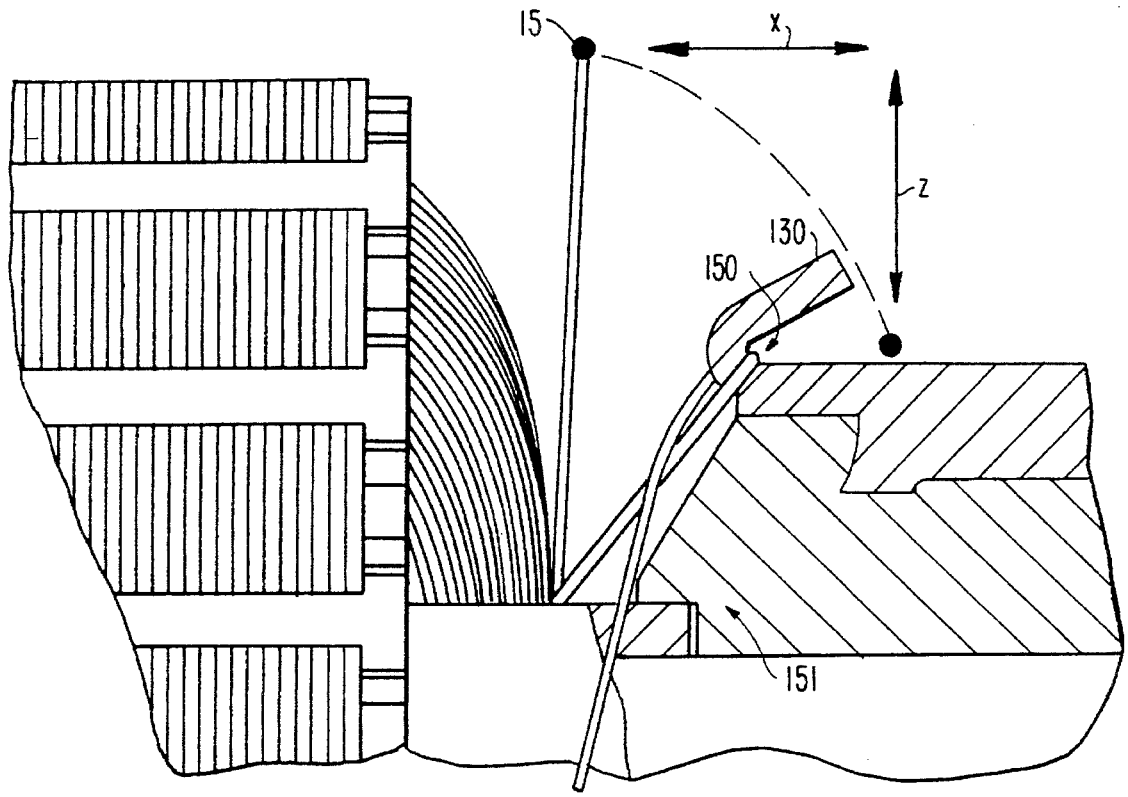
FIG. 16 is a view taken along the line 16—16 in FIG. 14.

FIG. 13 shows an embodiment of the invention which is especially suitable for winding armatures having extremely small slot openings compared to the wire size that must be wound. For armatures of this type, it may not be sufficient to just guarantee that the wire delivery point of the needle moves according to particular predetermined trajectories in order to avoid problems such as contact between the wire and insert corners 61. In this embodiment, a needle 120 having a flange 119 which extends radially out from the remainder of the needle around the wire outlet is positioned in relation to a first of the coil receiving slots so that a portion of the flange covers one of the dove tail borders 121, 122. In particular, as shown in solid lines in FIG. 13, flange portion 123 covers border 121 of the slot. This keeps the wire on a predetermined alignment 124, particularly when the needle is required to draw the wire through the entrance of the slot. By maintaining the wire on such an alignment, it does not catch on the corner 125 of the insert when the needle moves along axis X to draw the wire through the entrance of the slot.

In the embodiment shown in FIG. 13 the armature is translated along axis X, and the needle is capable of moving along axes Y and Z. Once the needle has moved beyond the opposite stack face, it is moved long axes Y and Z in order to draw the wire to form the external portion of the coil and to align the wire delivery point with the entrance of the second coil receiving slot of the stack (position 126). At the end of such movement, the needle will be positioned with the opposite portion 127 of flange 119 aligned to cover dove tail border 128. Before reaching this condition, the armature will have rotated on angular axis theta in order to obtain the correct angular orientation between slot border 128 and the needle flange, if the slot disposition is such that this cannot be accomplished by just moving along axes Z and Y. Once this has occurred, the armature can be translated along axis X in order to draw the wire through the slot entrance and to deliver the wire along the slot itself until the needle is at a predetermined distance beyond the opposite face of the stack.

Figure 19:
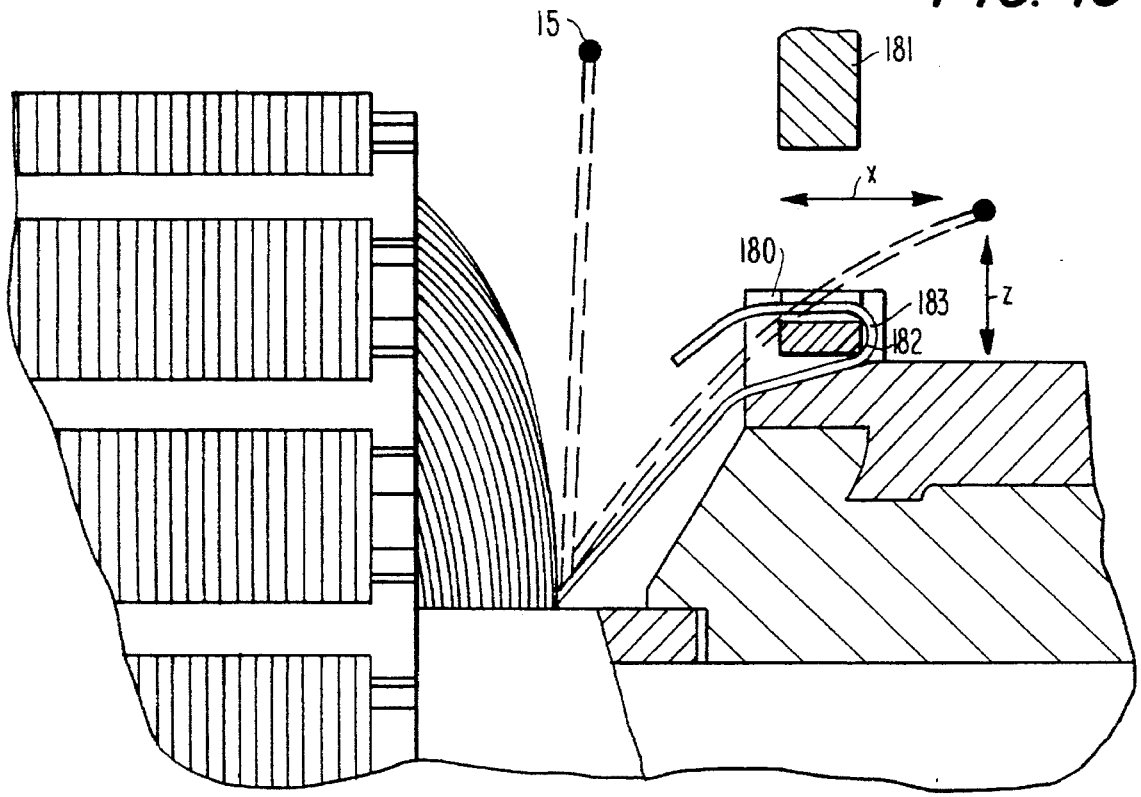
FIG. 19 is a view similar to FIG. 16 but showing attachment of a wire to a different type of armature commutator in accordance with this invention.

In any of the above-described embodiments, after a coil has been completely wound (i.e., the correct number of turns have been laid in a pair of predetermined slots), a lead must be formed and connected to a predetermined connection of the commutator. Such a commutator connection is typically a tang 130 as shown in FIGS. 14–18 or a slot 180 as shown in FIG. 19. Once winding of a coil has been completed, the wire delivery point (positioned at a predetermined distance beyond the stack face nearest to the commutator) is moved along a predetermined trajectory obtained by movements along axes X, Y, Z, and theta in order to align the wire with a predetermined tang or slot of the commutator. This may have had the effect of wrapping the wire around the free portion of the armature shaft, or in some cases just for clearing the most forward extremes of the coils partially wrapped around the armature shaft.

In the case of a lead connection to a commutator tang 130 having the configuration shown in FIG. 15, commonly known as an alpha configuration, the wire comes from direction 140, wraps around the tang following the arrows 142, and then goes to a next slot of the stack along direction 143. To obtain a configuration of this type, the wire delivery point is aligned on one side of the tang as shown in FIG. 14. The wire delivery point is then subject to movement along axis X so that the wire is positioned beyond and on one side of the tang. The wire delivery point is also subject to movement along axis Z so that the wire is brought practically on the same level as that of the wire receiving portion 150 (FIG. 16) of the tang. The wire delivery point is then moved along axis theta or along axis Y in order to wrap the wire behind the corresponding tang, and then backwards along axis X to wrap the wire around the opposite side of the tang (see the completed connection 151 in FIG. 16).

Movement of the wire delivery point along the previously stated axes is carried out for predetermined extents depending on parameters which include the tang size, the number of tangs, the commutator size, and the size of the wire to be wound.

Other lead connection configurations which can be obtained by moving the wire delivery point along axes X, Z, Y, and theta are shown in FIGS. 17 and 18.

Once the wire has been wrapped around the tang, the wire delivery point is moved along a further predetermined trajectory obtained by movement along axes X, Z, Y, and theta in order to align the wire with the next wire receiving slot of the stack. Such a trajectory must also have the effect of maintaining the wire tensioned around the tang, and wrapping the wire along predetermined paths in order to reach the wire receiving slot of the armature.

Connection of a lead to a typical slot connection 180 of a commutator is shown in FIG. 19 After a coil has been completed and the wire delivery point has moved to be aligned with the required commutator slot, the wire delivery point is moved for predetermined amounts along directions X and Z in order to align the wire over such a slot. Once this has been accomplished, suitable insertion tooling 181 inserts the wire and also peens the slot. The wire delivery point can then move backwards along directions X and Z to form a lead loop 183 over the peening point 182. Finally, the wire deliver point is moved along a predetermined trajectory to align the wire with the next wire receiving slot of the stack.

When all the coils of the armature have been wound and the lead connection to the final tang or slot has been carried out, the wire delivery point moves for predetermined amounts along axes X, Z, Y, and theta in order to draw the wire along a predetermined direction near to a wire holding gripper (not shown but typically conventional). Once this has occurred, the wire gripper can be operated to grasp the wire and thereby retain it for winding a successive armature. In order to free the finished armature, a cutting device (also not shown but typically conventional) then cuts the wire leading to the gripper as close to the commutator connection as possible.

To choose the required movement of the wire delivery point in order to obtain lead attachment to tangs or slots as has been described above, trials are generally conducted for each type of armature to be processed. Such trials supply trajectory information relative to the trajectory that the wire delivery point must follow in order to make the lead attachment. This information depends on parameters such as the armature size, the commutator size, the number of commutator connections, the lead pattern going to and from the commutator connections, and the external configuration which the coils have. Once this information has been obtained, it can be stored in control unit 115 and used each time a related armature needs to be processed.

To obtain high production rates of wound and terminated armatures using the principles of the invention, a set of armatures can be wound at the same time by having respective wire delivery points accomplish identical trajectories in relation to their respective armatures. In a situation of this type, single actuators for each of the described axes can be mechanically connected to the various delivery points, so that the latter can be moved in relation to their respective armatures. In this way a single control unit 115 can ensure that all of the wire delivery points move simultaneously on identical predetermined trajectories and in required timing.

Figure 20:
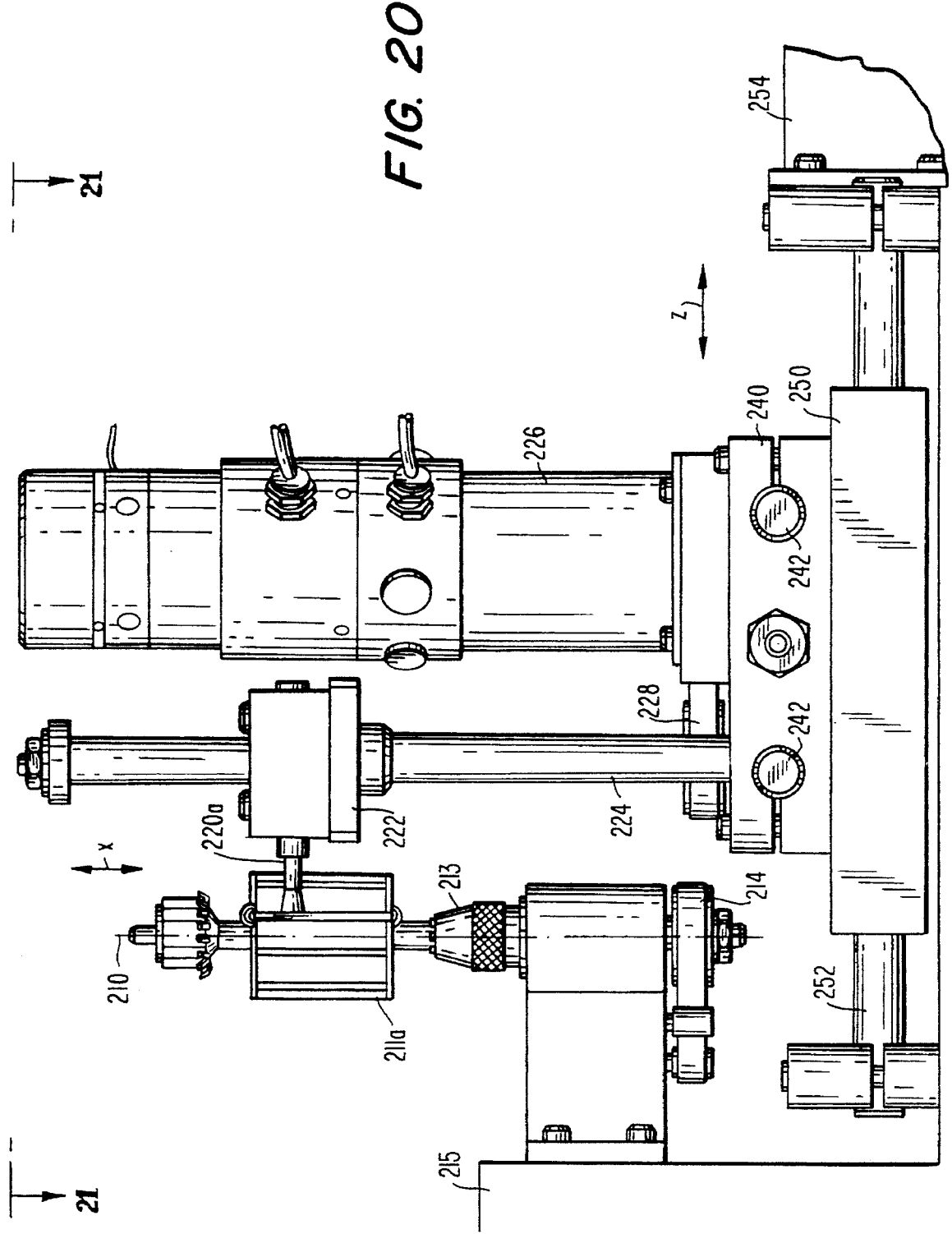
FIG. 20 is an elevational view of illustrative apparatus constructed in accordance with the principles of this invention for simultaneously winding a plurality of armatures.
Figure 21:
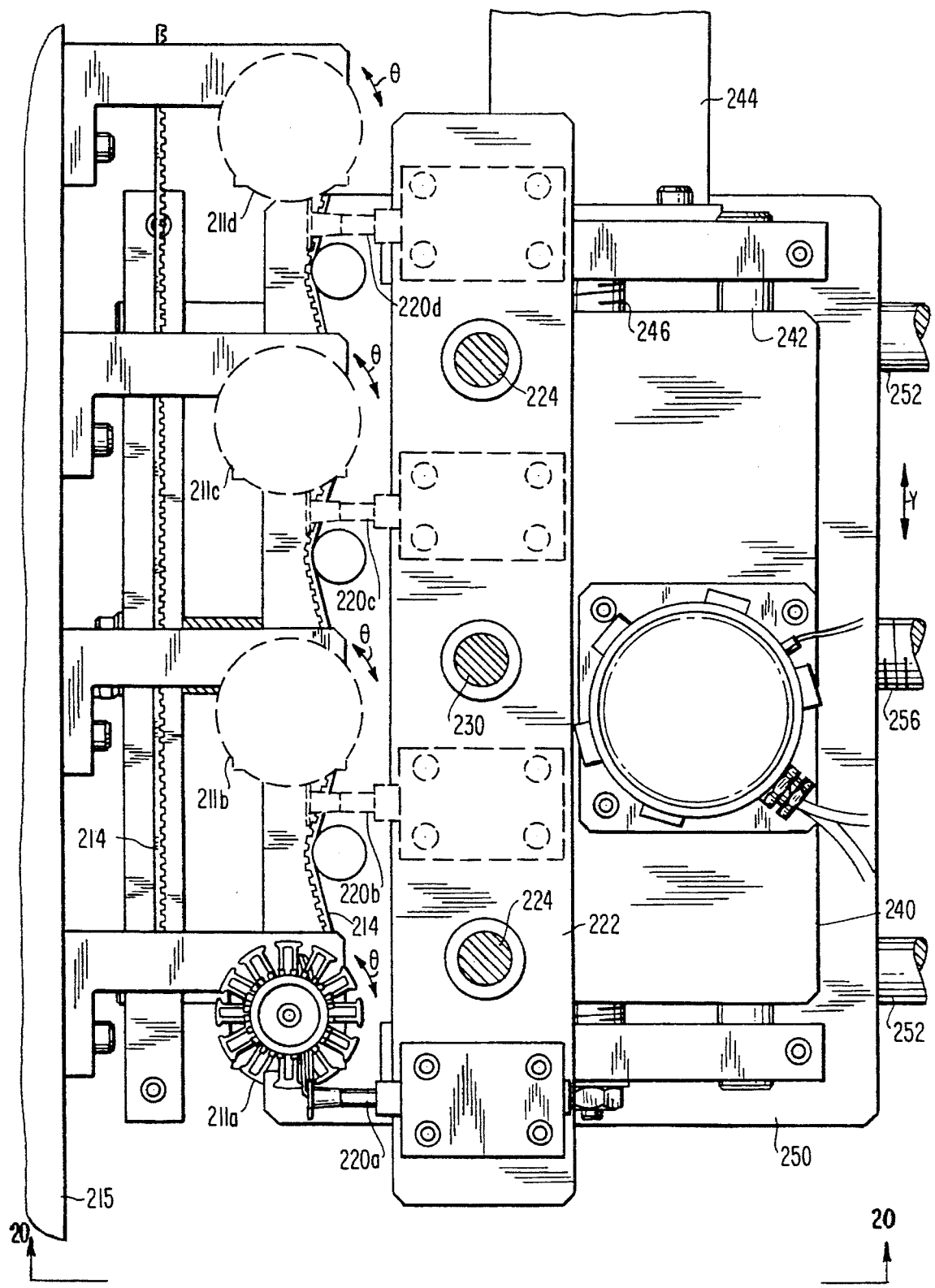
FIG. 21 is a plan view taken along the line 21—21 in FIG. 20.

FIGS. 20 and 21 show an illustrative embodiment of the invention including one way in which the various actuators can be mechanically interrelated, and also showing how one set of actuators and controls can be used to wind several armatures at the same time. This embodiment uses flanged needles of the type shown in FIG. 13.

Each of armatures 211a–d is maintained in a vertical orientation along an associated axis 210 by means of an associated gripper 213 which holds the associated armature shaft remote from the commutator. The parts of each gripper 213 which hold an armature shaft are connected by means of a common belt transmission 214 to a motor (not shown, but analogous to actuator 104 in FIG. 10) for rotating all of the armatures in unison along associated theta axes. All of grippers 213 are mounted on a common fixed frame structure 215.

A needle 220 is respectively associated with each of armatures 211 for depositing armature coil wires in slots of the associated armature. All of needles 220 are clamped to a common cross plate 222. Cross plate 222 is slidably mounted on guides 224 for movement along the X axis relative to armatures 211. Motor 226 produces this motion of cross plate 22 by means of a belt transmission 228 to screw 230.

Elements 224, 226, 228, and 230 are all carried by plate 240. Plate 240 is guided by guides 242 and caused to move parallel to the Y axis by motor 244 which acts on plate 240 through screw 246.

Elements 242, 244, and 246 are all carried by plate 250. Plate 250 is guided by guides 252 and caused to move parallel to the Z axis by motor 254 acting on plate 250 through screw 256.

The motors mentioned in connection with this embodiment are driven by a common control unit such as unit 115 in FIG. 10. Accordingly, all of needles 220 are driven at the same time with identical motions in order to simultaneously wind several similar armatures.

It will be understood that the foregoing is merely illustrative of the principles of this invention, and that various modifications can be made by those skilled in the art without departing from the scope and spirit of the invention. For example, although the preferred embodiment shown in FIG. 10 is capable of producing relative motion between armature 11 and wire delivery point 15 along four axes (X, Y, Z, and theta), it may be possible in some situations to eliminate one or more of these axes of relative motion. Similarly, although in the preferred embodiment shown in FIG. 10 all four axes of relative motion (X, Y, Z, and theta) are controlled by programmable control unit 115, it may be desired in some situations to have only some of these axes of relative motion under programmable control, while other axes of relative motion are under other forms of control (e.g., cams and cam followers such as are used in the prior art) which are not programmable.

What is claimed is:

1. A method of winding a wire on an armature having an axial shaft, a core member permanently and fixedly mounted concentrically on said shaft, and a commutator permanently and fixedly mounted concentrically on said shaft at a location which is axially spaced from said core member, said core member having a plurality of circumferentially spaced, radially and axially extending slots, and said commutator having a plurality of circumferentially spaced coil lead termination structures, said wire being dispensed from a wire outlet of a wire dispensing member which is movable relative to said armature, said method comprising the steps of:

anchoring the wire extending from said wire outlet relative to said armature;

moving said wire dispensing member relative to said armature so that wire is pulled from said wire outlet during this step at least initially as a result of said anchoring step and is wound in a first coil around said core member by passing wire in a repeating succession (1) through a first slot, (2) adjacent a first axial end of said core member from said first slot to a second slot, (3) through said second slot, and (4) adjacent a second axial end of said core member from said second slot back to said first slot, the wire dispensing member following a first path of movement relative to said armature during this step such that the wire touches substantially only the wire dispensing member, the armature, and previously wound wire in travelling from said wire outlet to said first coil;

after completion of said first coil, moving said wire dispensing member relative to said armature so that wire pulled from said wire outlet during this step passes through a first of said coil lead termination structures on said commutator so that said wire is permanently retained by said first coil lead termination structure prior to performance of any claimed step following this step, the wire dispensing member following a second path of movement relative to said armature during this step such that the wire touches substantially only the wire dispensing member, the armature, and previously wound wire in travelling from said wire outlet to said first coil lead termination structure; and after completion of the immediately preceding step, repeating the two preceding steps using the same wire dispensing member an a continuous continuation of the same wire, but using different slots of said core member as said first and second slots and using different coil lead termination structures of said commutator as said first coil lead termination structure until a desired number of coils have been wound on said core member.

2. The method defined in claim 1 wherein said second axial end of said core member is closer to said commutator than said first axial end of said core member, and wherein said step of moving said wire dispensing member relative to said armature to wind said wire around said core member comprises the step of passing said wire outlet between said second axial end of said core member and said commutator in order to pass said wire adjacent said second axial end of said core member from said second slot back to said first slot.

3. The method defined in claim 1 wherein each of said lead termination structures comprises a respective tang which extends radially out from said commutator and which is inclined away from said core member in the radially outward direction, and wherein said step of moving said wire dispensing member relative to said armature to pass said wire through said first coil lead termination structure comprises the steps of:

- moving said wire dispensing member relative to said armature so that said wire outlet passes adjacent a first circumferential side of the tang of said first coil lead termination structure to a first location which is axially beyond said tang in the direction away from said core member;
- moving said wire dispensing member relative to said armature so that said wire outlet passes substantially circumferentially relative to said armature from said first location to a second location which is also axially beyond said tang in the direction away from said core member but which is adjacent a second circumferential side of said tang; and
- moving said wire dispensing member relative to said armature so that said wire outlet passes adjacent said second circumferential side of said tang in moving from said second location back toward said core member and thereby looping said wire around said tang.

4. The method defined in claim 1 wherein each of said lead termination structures comprises a respective radially and axially extending channel in said commutator, and wherein said step of moving said wire dispensing member relative to said armature to pass said wire through said first coil lead termination structure comprises the steps of:

- moving said wire dispensing member relative to said armature so that said wire outlet passes substantially parallel to the channel of said first coil lead termination structure to a first location which is axially beyond said channel in the direction away from said core member so that said wire passes through said channel;
- crimping a portion of the channel which is radially outside of said wire so that said wire is retained in said channel; and
- moving said wire dispensing member relative to said armature so that said wire outlet moves from said first location back toward said core member.

* * * * *